United States Patent [19]
Bonnet

[11] 3,712,727
[45] Jan. 23, 1973

[54] METHOD FOR IMPROVING THE DIRECT VISION OF RELIEF SLIDES AND EQUIPMENT FOR CARRYING OUT SAID METHOD

[75] Inventor: Maurice Bonnet, Puteaux, France

[73] Assignee: Etablissement Public: Agence Nationale De Valbrisation De La Recherche Anvar, Paris, France

[22] Filed: March 2, 1971

[21] Appl. No.: 120,189

[30] Foreign Application Priority Data

March 6, 1970 France..................................7008103

[52] U.S. Cl. ......................355/22, 350/167, 352/43, 352/57, 352/86, 355/77
[51] Int. Cl. ........................G03b 27/32, G03b 35/14
[58] Field of Search ........355/22, 77, 46, 54; 352/43, 352/57, 58, 86; 350/167

[56] References Cited

UNITED STATES PATENTS

| | | | |
|---|---|---|---|
| 2,045,129 | 6/1936 | Farrand | 355/22 |
| 3,528,736 | 9/1970 | Jones | 355/22 |

Primary Examiner—Samuel S. Matthews
Assistant Examiner—Richard A. Wintercorn
Attorney—Baldwin, Wight & Brown

[57] ABSTRACT

The method consists (a) in decreasing the angular value of the apparent diameter of the light source seen by a refractive or reflecting lenticular element, in order that the rays reaching each lenticular element may be considered as parallel, this decrease being restricted to a controlled value depending on the constant of the optical surface considered as a diffraction network and (b) in decreasing as considerably as possible the distance between the diopters constituting an orientation optical system of the lightrays and the points of composite images receiving the said light rays. The invention is applicable to relief photography and cinematography. It improves the direct vision of relief slides and films.

23 Claims, 21 Drawing Figures

FIG. 10
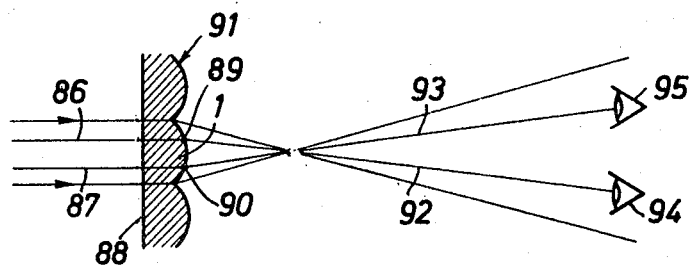
FIG. 11    FIG. 12    FIG. 13
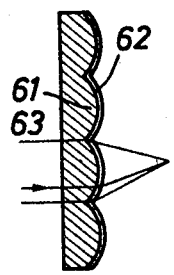 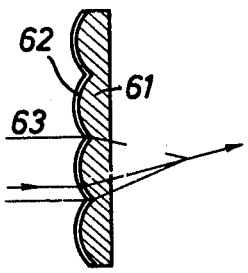 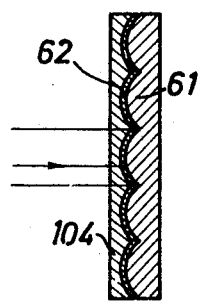
FIG. 14    FIG. 15
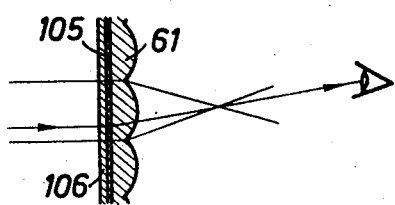 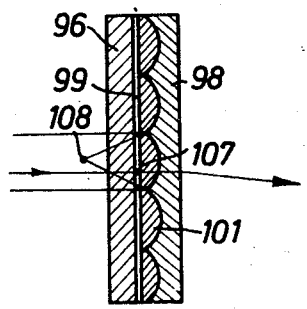

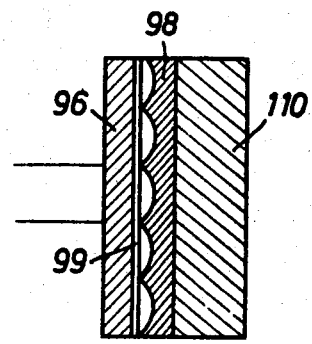
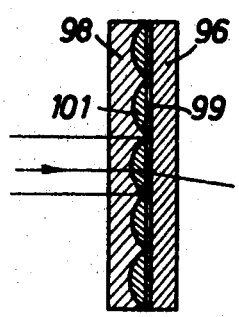
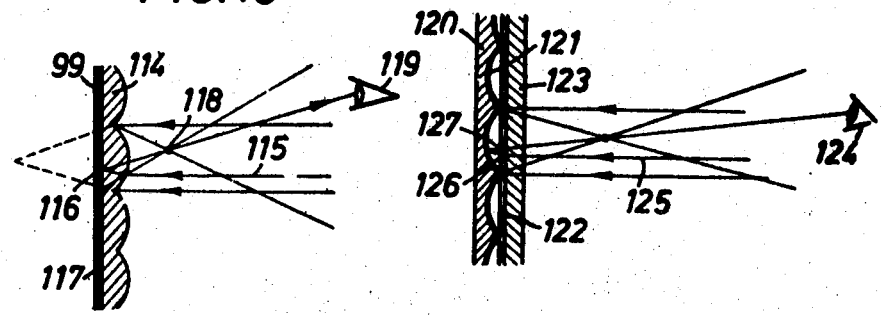
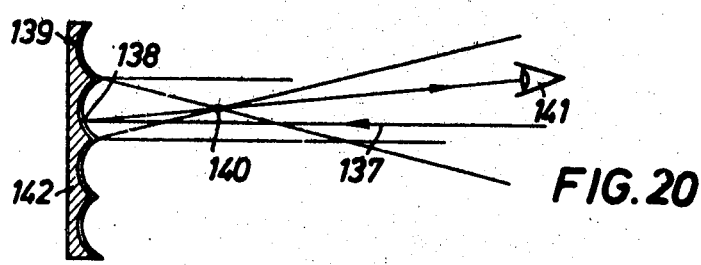
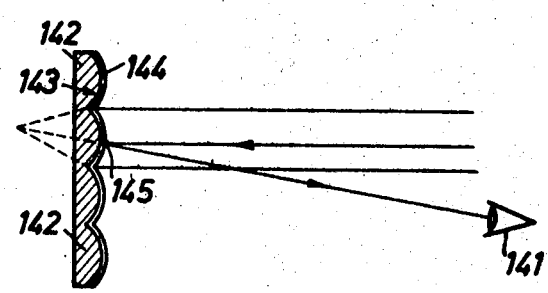

METHOD FOR IMPROVING THE DIRECT VISION OF RELIEF SLIDES AND EQUIPMENT FOR CARRYING OUT SAID METHOD

The present invention refers to relief photography and namely to the realization of a photographic equipment which makes possible a direct vision of slides.

According to the method applied up to now, light reaches and passes through a point of the composite image of a relief slide which is not crossed by a single ray or a beam of parallel light narrow enough to be considered as a ray, but by an actual divergent beam made of many rays of light issuing from different directions.

It results that the rays issuing from this beam pass through the transparent substrate by leaving the point in question and by moving apart from each other, reach the whole or a part only of the surface of the diopter according to the angular value of this divergent beam, each ray constituting this beam emerging afterwards from the point of the diopter surface it has crossed, in a direction set up by the curvature of the diopter at this point. The whole rays emerging from the diopter form then a beam which diverges more or less according to the form of the said curvature: it results that the diameter of this beam increases during the path of the said beam from the diopter to the pupil of the observer's eye, and, when it reaches this pupil, its diameter is largely bigger than this later's one. Consequently, the light rays issuing from the considered point of the composite image cannot all enter the pupil of the observer's eye, the case being the same for every point of the composite image because all of them are illuminated in a similar manner: through this overlapping of rays, the eye of the observer perceives rays issuing from several adjacent diopters, this overlapping of images resulting into a certain unsharpness on the edges of the observed image.

To this first cause of lack of perfection of the vision in relief of composite images, I must add the effects of different aberrations of geometrical nature, such as those occurring always in a diopter. Whatever its form may be, images cannot be absolutely correct, mainly if a rather big gap separates the composite images from diopters constituting short beam orientators.

The purpose of the invention is to improve considerably the quality of direct vision of relief film or slides. With this object in view, it aims to a new method which gives an important improvement of the optical surfaces comprising lenticular refractive or reflecting elements.

The method of this invention consists essentially, on the one side, in reducing the angular value of the apparent diameter of the light source seen by a lenticular refractive or reflecting element in the direction of the light rays deviation through the said element, in order to consider as being parallel the rays reaching each lenticular element, this reduction being restricted to a controlled value depending on the constant of the optical surface considered as a diffraction network, and, on the other side, in reducing as much as possible the range between the diopters forming an optical system for ray orientation and the points of composite images receiving the said light rays.

According to the invention, the angle $\alpha$ which defines the value of the apparent diameter of the light source must not be lower than the angle $\theta$ defined by the expression $$\theta = K \lambda / C$$

where $\lambda$ is the wavelength of the sodium D line, for example, C being the constant of the lenticular elements optical surface considered as a diffraction network in order that the observer perceive no trace of the diffraction spectrum and appreciate the light range as homogeneous.

The homogeneity of the light range can be still more improved by a two - or three -fold increasing of the value of the apparent diameter of the light range in order that the angle which defines said diameter seen by a lenticular element be a multiple of the spacing of the highest brightness values, and by selecting a whole number for increasing the apparent diameter of the light source according to the periodicity of peak values, in order to avoid that the repeated images of the light source overlap each other and result into light interferences at the central part of the range.

In a preferred form of embodiment, an optical adherence between the surface containing the composite image and the refractive surface of diopters is obtained by means of a transparent adhesive having a refractive index as close as possible from the one of the matter forming the image, thus by making practically nil the path between both surfaces and thus eliminating the reliefs existing on the first surface and caused by the important difference of opacity or colored pigments contained into the image.

The surface containing the composite image is not situated into the focal plane of the whole lenticular elements, but the bigger the deviation is between the position of the image to be visualized and the focal plane of the selector and the smaller the apparent diameter of the source must be, while remaining higher than the minimum above-mentioned limit.

According to the invention, each lenticular element has such a particularly limited action as to orientate and distribute, only into a solid angle defined by the characteristic values of the lenticular elements, each ray of parallel light beam which reaches and passes through a specific point of the composite image, in order that the observer's eye receive only this single ray or beam at a time, the color and light density of which are modulated by the crossed point of the image.

For avoiding that the modulated points or luminous lines forming the final image be perceptible for the observer, the lenticular elements have been so dimensioned that the ratio between the spacing of lenticular elements and the observation range be equal or lower than the visual acuity of the observer.

The invention refers also to the equipment for carrying into effect the method being the object of the invention.

In a first embodiment, the transparent substrate which holds the refractive lenticular elements remains of the current depth, which is approximately equal to the focal length of the diopters, the composite image being situated on the face opposite to the lenticular elements, the image being visible from the side of the surface including the lenticular elements, in relief through transmission, in one direction only.

In another embodiment, the image is brought as close as possible to the diopter surface, by juxtaposition or optical sticking, the depth of the transparent substrate being possibly reduced to a depth scarcely higher than the sag of the refractive lenticular elements the image being visible in relief from both sides of the film surface through transmission.

In another embodiment, the image completely adheres to the surface of the refractive lenticular element.

In another embodiment, the image is integral with the refractive lenticular element; the overall depth of the whole: emulsion, transparent substrate, sag of the refractive lenticular elements, being not higher that the current depth of an ordinary film having no lenticular elements, and the image being also visible from both sides of the film through transparency.

The image can be made integral with the lenticular element either by firstly casting the emulsion on the face itself of the transparent substrate having the refractive lenticular elements and of which the depth is very scarcely higher than the one of said elements, or by obtaining the lenticular elements by stamping on the face itself of the transparent substrate containing the composite image, by means of a die reproducing the print of the lenticular elements, after having recorded the composite image obtained through photography or printing, by carrying out the marking of the obtained lenticular elements and of their respective composite image.

In a given embodiment of the reflecting lenticular element surfaces, the reflecting power is obtained, for example, by means of aluminum deposition under vacuum or any other means, the image being located as close as possible to the reflecting lenticular element, by juxtaposition or optical sticking, the image being visible in one direction only through reflection.

Alternatively, the image is integral with the optical surface comprising reflecting lenticular elements, either with aluminum-plating carried out on lenticular elements before emulsion casting, the image being recorded afterwards; or with aluminum-plating carried out after printing of elements by pressing on a composite image obtained on the face of a transparent substrate through photography or printing, the metal deposition being made on the lenticular element side, or with aluminum-plating carried out after emulsion casting and realization of the composite image and printing of the lenticular elements through stamping after alignments have been marked, the image being observable in one direction only through reflection.

It has to be noted that the method according to the invention allows to use concave lenticular elements which give also the possibility of inverting the relief effect.

The light source may be of any conventional type with an optical system making the rays of light parallel or cooperating with such an independent system.

The invention is described more in detail hereafter by reference to the appended drawings, in which.

Figure 9:
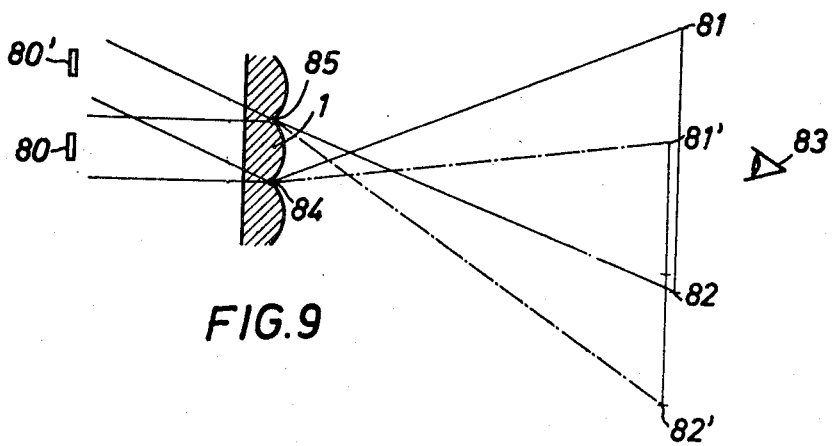

FIGS. 9 and 10 give the path of the rays when the image completely adheres to the lenticular element;

FIGS. 11 and 12 represent lenticular elements directly bearing the image;

FIG. 13 shows similar lenticular elements but coated with a protective lacquer;

FIGS. 14 up to 18 show different other embodiments of images-lenticular elements units;

FIG. 19 illustrates units allowing vision through reflection;

FIG. 20 and 21 show lenticular elements with which the image is integral.

It is known that the selection of the many images recorded into a relief photograph, for example carried out with an optical surface having refractive lenticular elements, is implemented when observing by the said surface the lenticular elements of which cover the transparent substrate face opposite to the image.

Figure 1:
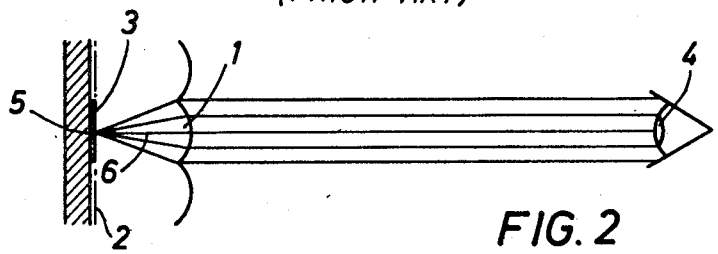
FIG. 1 is a fundamental diagram of the vision in relief according to a conventional method.
Figure 2:
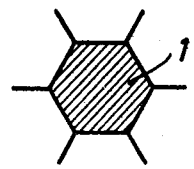
FIG. 2 illustrates an ideal image of a point of the relief photograph.

The section of such a relief slide can be seen as follows:

If one considers a refractive lenticular element 1 (FIG. 1) of spherical form, for example, i.e. having in its focal plane 2 and image 3 illuminated by a source of scattered light, and if one assumes (which is obviously not feasible) that this diopter can be absolutely free from geometrical aberrations and perfectly focused for any point whatsoever of its image, when the eye 4 of an observer will look to the diopter surface, any point 5 of the image 3, located onto the optical axis 6 joining the eye pupil to the optical center of the diopter, should appear under an apparent diameter corresponding to the totality of the surface diopter, as illustrated in FIG. 2.

Figure 3:
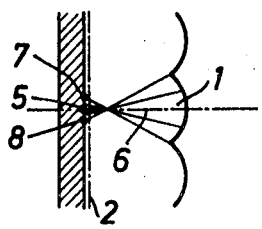
FIGS. 3 and 4 illustrate the drawbacks resulting from the sphericity aberration, according to the prior art method.

This figure illustrates this ideal case where the diopter 1, seen in front view by the observer, would be perceived by this observer under the form of an homogeneous range corresponding to a determined point of the image, but it is well known that outside geometrical aberrations of geometrical nature: sphericity aberrations, coma, distortion, astigmatism, chromatism, field curvature, some defects exist which are due to phenomenons of diffraction, diffusion and to the unaccuracy of the focusing. FIG. 3 shows the drawbacks resulting from the only aberration of sphericity, considered as an example. On this figure, the image 3 has been slightly deviated from the focal plane 2 in order to increase the shifting of rays due to the aberration of sphericity and to make easier the understanding of the drawing.

It results from this aberration that the whole rays issuing from the diopter surface and which form the light beam entering the pupil of the observer's eye are not constituted by a single point 5 enlarged by the diopter 1, but also by the adjacent points 7,8 .... which makes perceptible to the observer's eye, through the same diopter, not only the point 5 but also and together the adjacent points 7,8 ....

Figure 4:
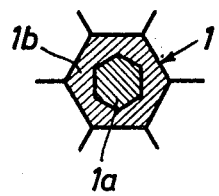

The diopter 1 of FIG. 3, seen in front-view by the observer, has been illustrated in the diagram of FIG. 4. In a same point of view, the observer sees a central area 1a corresponding to the point 5 and an annular area 1b issuing from the points 7,8 .... due to the transverse aberration of the spherical diopter.

In other words, by using the previous method, and due to the fact that a diopter always shows geometrical aberrations, whatever its form may be, (spherical, elliptical, parabolic, etc.) it cannot transmit only one single point of the recorded image corresponding, for example, to a very specific point of view of the camera such as would require the theory of relief photography. At the same time, it transmits a fraction of the image points located in the neighborhood of the point 5 and which can correspond, for example, to different points of view, this fraction being important enough for decreasing the definition of the relief image and, consequently, its field depth.

Figure 5:
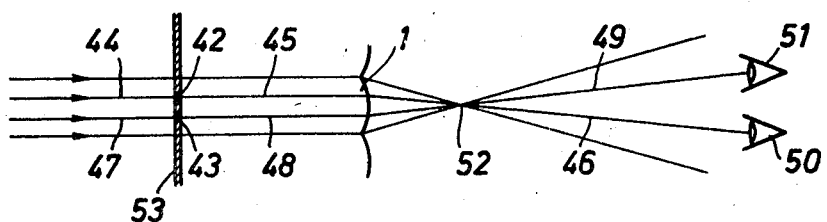
FIG. 5 shows the basic principle of the invention.

According to the general definition of the invention, it is firstly necessary, as the FIG. 5 shows, to produce parallel light rays 44,47 reaching the surface of the composite image 53 corresponding to the lenticular element 1 and crossing the points 42 and 43 of the said image, which pass only the colored rays and the luminous intensity corresponding to their color and to their respective degree of opacity. The rays 44,47 proceed on their linear path 45 and 48 through the transparent substrate, are refracted by the element 1 and form then the rays 46 and 49 which, together with the overall rays of the diopter, form then the caustic 52 located in the neighborhood of the object focus of the diopter 1 and reach finally the left eye 50 and the right eye 51 of the observer through the refracted rays 46 and 49.

It has to be stated that, from a given point of view, the caustic formed by the overall rays issuing from the diopter 1, cannot be perceived in its totality by the pupil of the observer's eye, because the pupil of the eye is a diaphragm of small dimensions, which can only perceive at a time a very narrow beam, limited here to a single ray, or a parallel and very narrow light beam which can be considered as a single ray, and the observer can only sequentially see all rays constituting this caustic, by moving his pupil from one point of view to another.

If I except chromatism, which exists only with refractive lenticular elements, and diffusion, it can thus be stated that, whatever the nature of the aberration or of the defect may be, the eye 50 of the observer will only see the point 42 transmitted by the diopter 1 outside any other point.

According to the second characteristic of the invention, the selecting power depends at first on the angular value of the apparent diameter of the light source seen by the point 42.

If the optical surface (FIG. 5) is considered as a diffraction network, the angular value of its angle of diffraction can be defined by the expression $$\sin \theta = K \lambda / C$$

where C represents the network constant, $\lambda$ the wavelength of the D sodium line, for example, and K a whole number which is the serial number of the maximum of light.

The angle $\alpha$ which defines the value of the apparent diameter of the light source should not, according to the invention, be lower than the angle $\theta$ defined by the previous expression.

By following this rule, the observer does not risk to see the trace of a diffraction spectrum and the luminous range will begin to look homogeneous to him.

As an example, if the pitch C of the lenticular element is equal to 0.4 mm, with a distance between the light source and the element plane of 1,200 mm, the wavelength $\lambda$ being equal to 0.55/1000 and $K = 1$, I will have:

$$\sin \theta = (0.55 \times K)/(1000 \times 0.4) = 0.001375$$

The width of the light source should not be lower than $1200 \times 0.001375 = 1.65$ mm.

Figure 6:
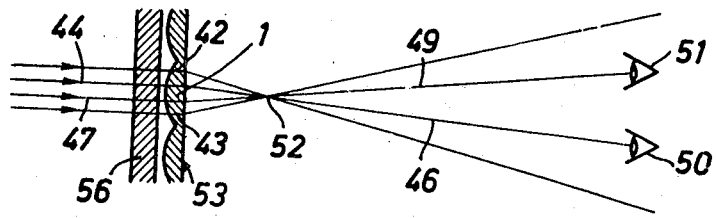
FIG. 6 shows the principle of one of the devices according to the invention.

FIG. 6 shows the principle of an alternative embodiment.

On this figure, it can be seen that the rays 44 and 47 pass the substrate of the film 56 and reach the points 42 and 43 of the composite image 53 the diopters of which are turned to this substrate and very close to it. The rays are refracted according to 46 and 49 by the diopter 1 and enter respectively the pupil 50 and the pupil 51 of the observer's eyes.

On the other side, it is necessary according to the invention that the composite image being used do not modify the path of the light rays which cross it. In other words, the composite image should have the maximum transparency together with the lowest possible diffusion.

An excellent performance is obtained, in this purpose, by realizing an optical adherence with a transparent adhesive whose refractive index is as close as possible to the one of the matter constituting the composite image, in order to eliminate the reliefs existing on the surface containing the image and induced by strong differences of opacity or by the colored pigments contained into the image.

This arrangement, in accordance with the invention, is characterized by the fact that the path of the light rays between the surface containing the composite image 53 (FIG. 5) and the refractive surface 1 of the diopters can be nil.

Contrary to the known devices, the surface containing the composite image is no more located into the focal plane of the overall lenticular elements.

I established that, when the distance between the composite image plane and the plane containing the surface of the diopters decreases, the definition of the final image shows an increase of quality, as well for fore-planes as for back-planes.

As a matter of fact, according to the method of the invention, each lenticular element has a limited specific action which only consists in orientating and distributing, within a solid angle limited by the characteristics of the lenticular elements, each ray of beam of parallel light reaching and crossing a precise point of the composite image, so that the observer's eye receives only this single ray or beam at a time, the color and luminous density of which are modulated by the crossed point of the image.

The fact that the overall rays or beams which emerge from the diopter surface do not reach the same point, and that the light distribution is not uniform on the illuminated spot has no consequences on the selection or the definition of images.

Figure 7:
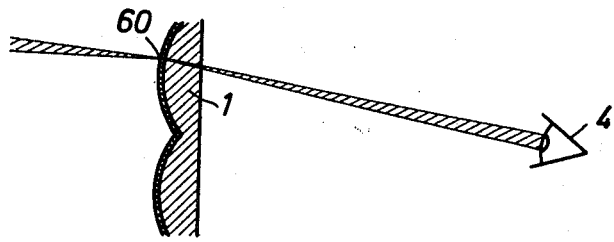
FIG. 7 illustrates a lenticular element bearing directly the image.

Within the scope of the invention, it has been established that it was advantageous to rigorously eliminate everything contributing to induce an opening out of the beams emerging from the surface of the diopters; thus, according to the invention, the maximum performances are obtained when the image is located on the surface proper of the diopters as illustrates the FIG. 7.

As it does not appear possible to decrease the apparent diameter of the light source to extreme values, in view of effects induced by diffraction due to the action of the optical surface having lenticular elements as a diffraction network, it is very obvious that if the range between the diopter 1 and the point 60 of the image is decreased to zero, the action of the diopter 1 will only be effected on the point 60 and not on a surface of certain dimensions, as on the FIG. 1, for example, the drawbacks due to the opening out of the beams induced by this surface will be eliminated: this fact has been ascertained in the practice.

An increase of diameter of the emerging beam can also be induced at given points of the image by the emulsion relief, which is due to strong differences of opacity of the image.

According to the invention, it is advantageous to eliminate the effect of this relief by filling these pits with an adhesive or a transparent lacquer having a refractive index approximately identical with the transparent matter which bears the composite image.

With the new method of the invention, the lenticular element is considered as a simple optical device for orientating the light rays.

Each point of the image is seen by the observer under its initial apparent diameter, and does not undergo any increase of diameter from the optical element.

Each point of the image is separated from the adjacent points by an interval equal to the deviation existing between the spherical lenticular elements.

In case the lenticular elements are cylindrical, the points are replaced by parallel luminous lines.

According to the invention, in order to avoid that the modulated points or luminous lines which constitute the final image be perceptible to the observer, the lenticular elements have been so dimensioned that the ratio between the spacing of the lenticular elements and the range of observation be equal or lower than the visual acuity of the observer.

Be $p$ the diameter or the width of the lenticular element and D the range of observation, it is advantageous that the value of $p$ or D be in accordance with the expression:

$$p/D \leq 3/10,000 \text{ radian.}$$

The fact that this new method leads also to an important improvement for what concerns focusing is also to be underlined.

As a matter of fact, the focusing of optical surfaces having lenticular elements has always been a difficult problem. With the new method, this problem does not exist any more as there is no focusing range (FIG. 7).

Moreover, the fact that the depth of a lenticular element is nil allows to obtain a maximum value of the angular field of this element. Theoretically, this angle can reach 180° in case of the reflecting concave lenticular element.

Figure 8:
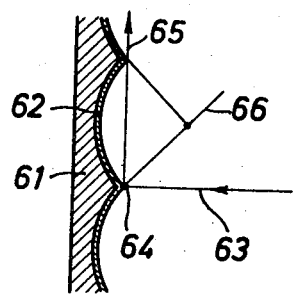
FIG. 8 illustrates a concave spherical diopter.

The FIG. 8 represents an aluminized concave lenticular element 61 covered with an image 62, a light ray 63, reaching on the edge of the lenticular element the point 64 which reflects the ray 63 in a direction 65 located at 45° from the bisectrix 66, the curvature of the lenticular element encircling an arc of 90°.

A refractive lenticular element can easily reach an angular field of 90°.

This value can be obtained without alteration of the definition of the final image.

It has to be noted that, when the image 84 (FIG. 9) completely adheres to the surface of the refractive lenticular elements, if the light source 80 is moved in 80′ in the direction perpendicular to the alignment of the lenticular elements, the image perceived by the eye 83 moves at the same time as the observation range 81 and 82, the new location of which comes to 81′ and 82′, and this results into two new properties.

1. A simple lateral displacement of the light source obtained directly or through a mirror whose deviation angle varies and allows to move successively the images perceived by the eye of a motionless observer.

2. When the light source is still, if one modifies the angular position of the plane of the photograph surface with respect to the direction of the parallel rays, the image undergoes no noticable displacement.

On FIG. 10, the rays 86 and 87 cross the substrate of the film 88, reach the points 89 and 90 of the composite image 91, are refracted in 92 and 93 by the diopter 1 and enter respectively the pupils 94 and 95.

When the photograph plane is sloped, it is established that orientation of emerging rays is not modified enough for making this displacement noticeable for the observer. Practice shows that the image stability and moreover its definition remain remarkable under very strong slopes (45° for example).

FIG. 11 shows the arrangement represented in the FIG. 8 where the image 62 is located on the surface itself of lenticular elements 61 the said elements being convex on the FIG. 11 while being concave on the FIG. 8.

This arrangement is obviously the most rational, as well from a point of view of optical efficiency as for the possibility of utilization in optical equipments featuring film movement.

The FIG. 12 represents the same arrangement as the FIG. 11, but the parallel rays 63 enter from the side of the surface of lenticular elements 61 containing the image, and not from the back side.

In case the film has to stand repeated displacements in the runner of a camera, it is, according to the invention, coated with a transparent layer of lacquer 104 (FIG. 13) having a lower index than the substrate, in order to be converted into a parallel-face plate, the radius of curvature of lenticular elements being lower for keeping the same optical characteristics.

It has to be noted that the relief is inverted if the convex elements are replaced by concave elements of same dimensions and radius. On the contrary, if the value of this radius is modified, the depth of the observed relief is also modified.

In the embodiment represented in FIG. 14, the film 94 containing the composite image is suppressed and replaced by the transparent substrate 61 having the lenticular elements the image 105 being located on the back face of the said substrate, and the parallel light rays entering through this face. According to the invention, the relief effect of the image can be eliminated by coating the image with a transparent lacquer 106 spread very uniformly.

In every case, the invention offers a new possibility which does not exist with the conventional method, as it allows to invert each composite image element by using a concave lenticular element in place of a convex lenticular element.

Thus, if I examine the FIG. 15, it can be seen that the point 107 of the composite image 99 is crossed by a parallel light ray orientated in the opposite direction of the one indicated in the FIG. 10, when it emerges from the optical surface 98 having the concave lenticular elements. The focus, which was real and located on the observer's side in the FIG. 10, is now virtual and located in 108 towards the light source in the FIG. 15.

The new mode of use of optical surfaces with concave lenticular elements implies the same non-restrictive alternative embodiments described hereunder as those with convex lenticular elements.

The FIG. 16 illustrates an alternative embodiment where the optical surface 98 has been stuck preliminarily on a rigid transparent substrate 110, the lenticular elements being possibly directly printed on this substrate made of plastics and the illumination being possibly carried out from one or another side.

The FIG. 17 shows a similar arrangement as the one of FIG. 15 but reverted, the light rays entering the back face of the transparent substrate including the concave lenticular elements.

The FIG. 18 illustrates an embodiment where can be seen a slide 114 on the back face of which have been printed spherical convex lenticular elements. A light ray 115 enters the surface of one of the diopters reaches the point 116 of the composite image 99, is reflected by an aluminum-plated surface 117, emerges from the diopter surface by undergoing a second refraction, is focused at the focus 118 and enters the pupil of the eye 119.

The stray reflection of the diopter surface can be attenuated by an anti-reflection coating.

An analog arrangement can be implemented, but with concave elements replacing the convex lenticular elements, which allows to invert each elementary image of the composite image 99.

In this arrangement, the field of each elementary image should be smaller than the angular field of the lenticular element so that the rays located at the edge of each diopter are not sent back to the adjacent diopters.

The FIG. 19 shows an arrangement consisting of a substrate 120 which can be opaque, having concave lenticular elements of aluminum-plated surface 121, said elements being juxtaposed to a composite image 122, of a slide 123, the back face of which is directed towards the observer 124.

In another embodiment, the image is integral with the surface of the reflecting lenticular elements.

This arrangement illustrated in the FIG. 20 offers a great advantage over other arrangements.

In the said figure, the said light ray 137 reaches a point 138 located on the aluminum-plated surface 139 of a diopter, is reflected towards the focus 140 via the said aluminum-plated surface 139 and enters directly the pupil 141 of the observer's eye.

In this arrangement, there is no stray reflection of the surface such as the one of FIG. 18, which is induced by the diopter surface; in the same manner, the eventuality of the limitation of the angular field of each elementary image with respect to the one of the lenticular element in order that the rays being at the edge of this element be not sent back to the adjacent diopters is not to be taken into consideration because the reflecting surface is mingled with the surface of the image, the light ray does not pass two points.

The drawback resulting from the reflection of the light source does not exist, because there is no polished plane surface of the image substrate being set before the lenticular elements.

The FIG. 21 illustrates an analog arrangement, which features convex spherical elements 142, the aluminum-plated surface 143 of which is covered with the composite image 144; a light ray which reaches the point 145 is then directed in the opposite direction as the ray of the FIG. 20 located at the same height as a concave element.

The method of the invention can be applied for realizing an equipment allowing for any observer the direct vision of relief slides, this vision being definitely improved with respect to the vision allowed by the actual equipment and where a point of the composite image issues from several directions at the same time, resulting thus in the overlapping of one image over the other when the observer looks to the slide under a higher and higher incidence.

What I claim is:

1. The method of improving the direct vision of relief slides or films, which comprises the steps of:
    a. forming an optical surface consisting of a group of lenticular elements each having curvature in at least one plane to define focal points in said one plane located a selected distance from the optical surface;
    b. fixing a transparent, composite relief image close to said optical surface and spaced from said focal points;
    c. projecting light from a light source through said member and to said optical surface for deviation thereby; and
    d. controlling the size of the light source and the distance with which it is spaced from said optical surface so that the width of the light source at least in said one plane subtends an angle at said optical surface sufficiently small as to cause light rays reaching each lenticular element to be essentially parallel whereby such rays form a real or virtual caustic point located remote from an observer.

2. The method according to claim 1 wherein said angle is not less than K λ/C where K is a whole number, λ is the wavelength of the D line of sodium, and C is the pitch of said lenticular elements.

3. The method of presenting an improved relief image to an observer, which comprises the steps of:
    a. projecting light from a light source through a transparent, composite relief image member which is associated with an optical surface consisting of a group of lenticular elements having curvature in at least one plane;
    b. controlling the size of the light source and its distance from said optical surface so that light rays reaching each lenticular element are essentially parallel and so that the angular value of the apparent width of said light source in said one plane as seen by each lenticular element is restricted to a value related to the pitch of said lenticular elements considered as a diffraction network.

4. The method according to claim 3 wherein said angular value is not less than K λ/c where K is a whole number, $\lambda$ is the wavelength of the D line of sodium, and C is the pitch of said lenticular elements.

5. The method of improving the direct vision of relief slides or films, which comprises the steps of:
   a. forming an optical surface consisting of a group of lenticular elements each having curvature in at least one plane to define focal points in said one plane located a selected distance from the optical surface;
   b. fixing a transparent, composite relief image closer to said optical surface than said selected distance; and
   c. projecting light through said member and to said optical surface such that light rays reaching each lenticular element are essentially parallel.

6. A relief slide or film comprising:
   a rigid member of sheet-like form having one surface thereof formed with a group of lenticular elements to define an optical surface, each element having curvature in at least one plane to define focal points in said one plane located a selected distance from the optical surface; and
   a transparent, composite relief image on said rigid member disposed closer to said optical surface than said selected distance.

7. A relief slide or film as defined in claim 6 wherein said member is transparent and said image is adhered to that surface of said member opposite from said optical surface.

8. A relief slide or film as defined in claim 7 including transparent adhesive means securing said image to said member, said adhesive means having an index of refraction substantially the same as said image.

9. A relief slide or film as defined in claim 6 wherein said image is on said optical surface.

10. A relief slide or film as defined in claim 9 wherein said lenticular elements are concave.

11. A relief slide or film as defined in claim 9 wherein said lenticular elements are convex.

12. A relief slide or film as defined in claim 6 wherein said lenticular elements are concave.

13. A relief slide or film as defined in claim 6 wherein said lenticular elements are convex.

14. A relief slide or film as defined in claim 10 wherein said optical surface is reflective.

15. A relief slide or film as defined in claim 11 wherein said optical surface is reflective.

16. An optical system for presenting relief images to an observer, comprising in combination:
   a rigid member of sheet-like form having one surface thereof formed with a group of lenticular elements to define an optical surface, each element having curvature in at least one plane to define focal points in said one plane located a selected distance from the optical surface;
   a transparent, composite relief image on said rigid member disposed closer to said optical surface than said selected distance; and
   light source means for projecting light through said image for deviation by said optical surface, said light source means projecting light rays to each lenticular element which are essentially parallel.

17. The optical system according to claim 16 wherein the angular value of the apparent width of said light source means in said one plane as seen by each lenticular element is restricted to a value related to the pitch of said lenticular elements considered as a diffraction network.

18. The optical system as defined in claim 17 wherein said angular value is not less than $K \lambda/c$ where K is a whole number, $\lambda$ is the wavelength of the D line of sodium, and C is the pitch of said lenticular elements.

19. The optical system as defined in claim 18 wherein said member is transparent and said image is adhered to that surface of said member opposite from said optical surface.

20. The optical system as defined in claim 19 including transparent adhesive means securing said image to said member, said adhesive means having an index of refraction substantially the same as said image.

21. The optical system as defined in claim 18 wherein said image is on said optical surface.

22. The optical system as defined in claim 21 wherein said lenticular elements are concave.

23. The optical system as defined in claim 22 wherein said lenticular elements are convex.

* * * * *